United States Patent [19]

Jaerisch et al.

[11] 4,221,486

[45] Sep. 9, 1980

[54] INTERFEROMETRIC MEASUREMENT WITH λ/4 RESOLUTION

[75] Inventors: Walter Jaerisch, Boeblingen; GUM/u/ enter Makosch, Sindelfingen, both of Fed. Rep. of Germany

[73] Assignee: International Business Machines Corporation, Armonk, N.Y.

[21] Appl. No.: 949,311

[22] Filed: Oct. 6, 1978

[30] Foreign Application Priority Data

Dec. 27, 1977 [DE] Fed. Rep. of Germany ....... 2758149

[51] Int. Cl.$^3$ ............................................. G01B 11/02
[52] U.S. Cl. .................................... 356/357; 356/359
[58] Field of Search ........................ 356/345, 357, 359

[56] References Cited

U.S. PATENT DOCUMENTS 4,147,435  4/1979  Habagger ............................ 356/357

*Primary Examiner*—John K. Corbin
*Assistant Examiner*—Scott J. Sugarman
*Attorney, Agent, or Firm*—Henry Powers

[57] ABSTRACT

Described is a method for interferometric measurement in which a monochromatic, coherent and parallel, convergent or divergent radiation is directed onto the test object so as to generate in a manner of an interference fringe pattern, the distances between two adjacent fringes being correlated to λ/2 distances in the object space.

The radiation reflected from the object and containing an interference field, giving rise to said fringe pattern, is redirected onto the test object, e.g. by a suitable mirror arrangement under an angle of incidence different from the angle of incidence of the radiation first impinging on the test object.

This radiation, after reflexion from the test object, forms an interference field comprising four interfering components and producing, e.g. on an observation screen, an interference fringe field. By properly adjusting the angles of incidence of both radiations, the distances between adjacent fringes can be made to correspond to λ/4 distances in the object space.

9 Claims, 6 Drawing Figures

INTERFEROMETRIC MEASUREMENT WITH λ/4 RESOLUTION

RELATED APPLICATIONS

This application is the U.S. equivalent of German Application No. P2758149 filed Dec. 27, 1977 on which priority is claimed.

FIELD OF THE INVENTION

This invention relates to an interferometric measurement technique with λ/4 resolution.

BACKGROUND ART

Precise gap, thickness, and flatness measurings can be carried out by means of interferometric methods as these methods are not only non-destructive, relatively simple and fast, but also have the highest resolution. Recently, however, it has become evident that for many purposes, particularly the development and production of integrated semiconductor circuits, the resolution of these methods was insufficient since the values to be measured are much smaller than half the wavelength of visible light. The photoresist layers, as an example, which in the production of integrated semiconductor circuits are to be applied in numerous successive process steps, generally have a thickness of approximately 0.5 μm to 1.5 μm. For various reasons, particularly in the production of integrated semiconductor circuits in the submicron range, it becomes increasingly necessary to measure these thicknesses with a precision of at least ±10%. As the resolution of all interferometric methods is generally limited by half the wavelength of the light used, there are difficulties in the control of these parameters during the mass production of integrated circuits. Many special methods have been developed and proposed, for example, multi-color interferometry and comparator processes, some of them considerably increasing the resolution of the interference methods. However, these methods involved a remarkable amount of apparatus and they are so complicated, slow and subject to errors that they could be used only in a relatively small number of cases and under specific conditions. Their use in the monitoring and control of large industrial productions is therefore practically excluded in almost all cases.

The co-pending U.S. Application Ser. No. 820,985 filed Aug. 1, 1977, now U.S. Pat. No. 4,188,124 describes an interferometric method with λ/4 resolution, where a measuring beam is directed in a predetermined small angle onto a transmission grating, which is parallel to the surface to be measured, that one order of diffraction is directly reflection-diffracted at the grating, and the other three orders of diffraction are reflected from the surface to be measured and transmission-diffracted by the grating to extend in the direction of observation, and by their super-position generate an interference fringe field where the distances between the interference fringes correspond to distances of a quarter wavelength of the radiation used in the object plane. As the grating used has to have reflection and transmission properties adapted in very precise relationships to each other and to the reflectivity of the surface to be measured, and a grating constant adapted to the direction of incidence of the measuring beam and to the direction of observation, and as furthermore the grating has to be arranged very close to maximum 1 μm and exactly in parallel to the surface to be measured, the possible uses for this method are limited. It is in particular not suitable for the monitoring and control of the production of integrated semiconductor circuits as in the monitoring of large numbers of semiconductor chips, due to the unavoidable vibrations and contamination of the optics of the measuring device, measuring errors cannot be excluded. In particular, contamination or soiling of the highly sensitive grating, by the semiconductor chips passing it at a small distance and with high speed, is practically unavoidable, the use of this method for production monitoring and control is bound to create problems which practically exclude its use.

SUMMARY OF THE INVENTION

It is an object of the invention to provide a method and device for gap, thickness and/or flatness measurement with a particularly high resolution, which with a relatively small amount of apparatus and small demands to the skill of the operator is largely insensitive to vibration and soiling.

Compared with the proposed devices of the above-described type, the method as disclosed by the invention shows the advantage that the gap between the measuring device and the surface to be measured can be very large, up to 1 m and more, and that consequently, vibrations causing soiling and misadjustment can be relatively easily avoided in the measuring system. In the method as disclosed by the invention, no components requiring critical correlation to the respective conditions are used in the field of application for this method. Furthermore, contrasted to all known interferometric methods, it is possible to change the resolution by simply altering the angle of incidence of the measuring beam, from λ/2 to λ4, and vice versa. When a sufficiently large angle of incidence of the measuring beam onto the grating is selected, the method as disclosed by the invention can also be used for testing objects with a surface of poor reflection or diffuse scattering.

BRIEF DESCRIPTION OF THE DRAWINGS

The invention will be described in detail by means of the accompanying drawings, which form a material part of this application.

DISCLOSURE OF THE INVENTION

Figure 1A:
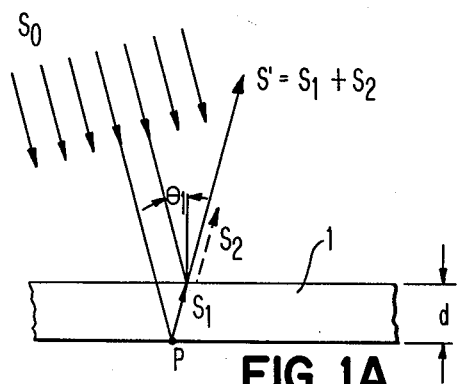
FIGS. 1A and 1B are a schematic representation of beam paths employed for explaining the method as disclosed by the invention.
Figure 1B:
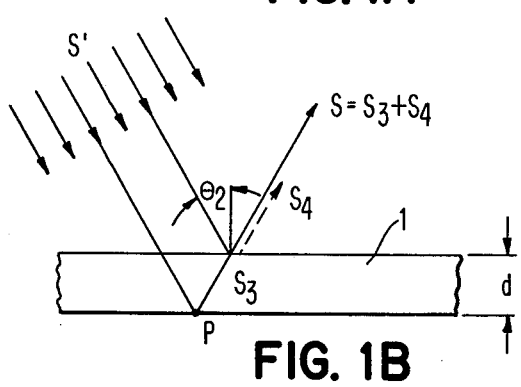

As shown by FIG. 1A, radiation $S_o$ consisting of plane coherent waves is directed at an angle $\theta_1$ onto a transparent disk-shaped object 1, and reflected from its lower and upper surface as radiation $S_1$ and as radiation $S_2$, respectively. Radiation S' generated by the superposition of components $S_1$ and $S_2$ is again directed, by means not shown and as indicated by FIG. 1B, onto object 1, this time at an angle $\theta_2$ and reflected from a lower and upper surface as radiation $S_3$ and $S_4$, respectively. Thus, radiation S generated by the superposition of the components is produced by the interference of the components $S_1$, $S_2$, $S_3$ and $S_4$. If the thickness of object 1 is not constant, radiation S' contains a Fizeau interference fringe pattern to which an interference fringe pattern is superimposed which is generated by the reflection of radiation S' from the lower and upper surface of the object, as indicated in FIG. 1B by radiation S. The difference $\theta_2 - \theta_1$ has to be adapted to the thickness "d" of object 1.

With thickness variation measurements at a transparent or semitransparent layer with the known Fizeau interference method, the interference pattern visible over the object in reflection is explained by coherent superposition of the partial bundles reflected from the front and the back of the layer. The basic concept of the invention resides in directing a Fizeau interference pattern, generated in the above described manner, of a layer to be measured by means of optical imaging for a second time onto the same layer, and thus to produce a second interference image of the layer thickness variations. With equal angles of incidence of the two illuminating radiations, the two interference patterns obtained are the same. However, if the second illuminating light impinges on the layer to be measured at a slightly different angle, there are differences between the first pattern and the second interference image. Depending on the amount of the angular difference, i.e. the change of phase in the second illumination beam, there is a splitting of the $\lambda/2$ Fizeau fringes, i.e. from $\lambda/2$ over all intermediate states to a $\lambda/4$ fringe pattern; and with a further change of the angular difference again over all intermediate states, and finally again a $\lambda/2$ pattern with a reversal of the intensity ratios to the first $\lambda/2$ image.

The generation of the interference fringe patterns is explained by means of the following specifications.

The superposition of the two components $S_1$ and $S_2$ produced through the reflection from the upper and the lower face of object 1 generally leads to a Fizeau interference fringe pattern with the fringe distance $\lambda/2$.

With the usual complex representation of a wave field:

$$u(\vec{r},t) = Re\{s(\vec{r})e^{i\omega t}\}$$

$$s(\vec{r}) = A(\vec{r})e^{i\gamma(\vec{r})}$$

where A is the amplitude, $\gamma$ the phase, and $\vec{r}$ the position vector at the place of superposition, the two components $S_1$ and $S_2$ generated by reflection can be described as follows:

$$S_1 = S_o \cdot e^{-i\pi}$$

$$S_2 = S_o \cdot e^{-i(2dk \cdot \cos\theta_1)}$$

where $S_o$ is the amplitude of the incident wave, d the optical thickness of the layer to be measured,
$k = 2\lambda/\lambda$, and
$\lambda$ the wavelength of the light. The coherent superposition of these partial components provides a resulting wave field:

$$S' = S_1 + S_2 = S_o \cdot i^{-i\pi}(1 + e^{-i(2dk \cdot \cos\theta_1 - \pi)})$$

The thus obtained wave field S' is returned by suitable optical measures to the test object so that a light beam reflected at the first reflection from point P of the lower surface of the object again reaches point P. In this manner, as indicated in FIG. 1B, the test object is again illuminated with a parallel wave field S' at an angle. This again produces by reflection from the lower and upper surface two components $S_3$ and $S_4$ which can be represented as follows:

$$S_3 = S_o(1 + e^{-i(2dk \cos\theta_1 - \pi)})$$
$$S_4 = S_o e^{-i(2dk \cos\theta_2 + \pi)} + S_o \cdot e^{-i\{2dk(\cos\theta_2 + \cos\theta_1)\}}$$

The superposition of these two components leads to:

$$S = S_3 + S_4 = S_o(1 + e^{-i(2dk \cos\theta_1 - \pi)})(1 + e^{-i(2dk \cos\theta_2 + \pi)})$$

In the direction $\theta_2$ there is the following intensity distribution:

$$I = \tfrac{1}{2}|S|^2 = 2S_o^2(1 - \cos(2dk \cdot \cos\theta_1))(1 - \cos(2dk \cdot \cos\theta_2))$$

This function describes the intensity at a discretionary point of the upper layer the distance of which from the lower layer equals d.

Figure 2:
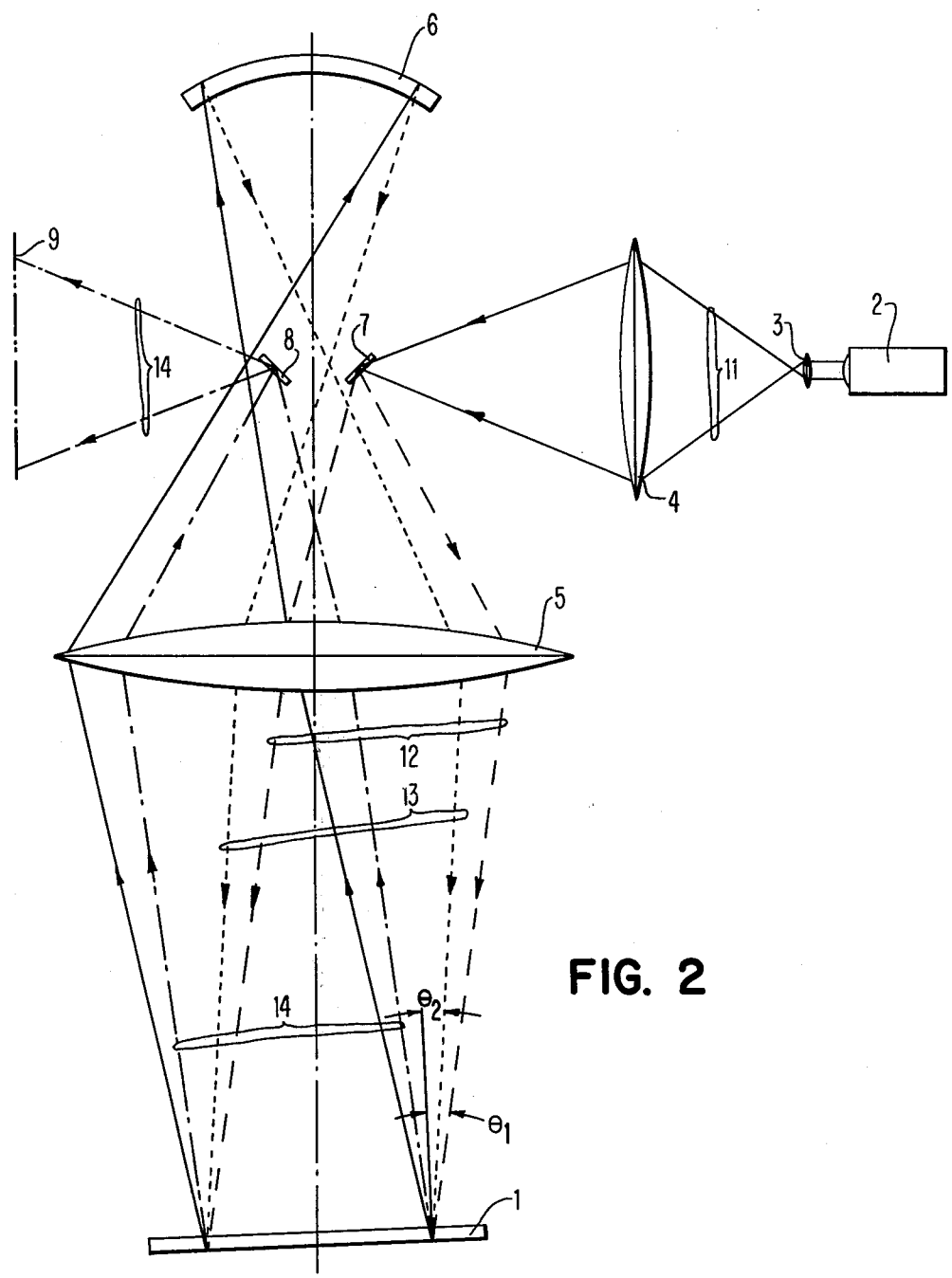

The embodiment of FIG. 2 includes a laser 2, lenses 3 and 4 for expanding the laser beam 11, a lens 5, a concave mirror 6, and of small adjustably arranged, plane mirrors 7 and 8. Beam 11 produced by laser 2 is expanded by the arrangement of lenses 3 and 4, and directed by mirror 7 via lens 5 as a bundle 12 of parallel beams represented by dashed lines, at an angle of incidence $\theta_1$ onto the object 1 to be tested. The components of beam bundle 12 which are reflected from the lower and upper surface of object 1 reach concave mirror 6 via lens 5, as indicated by the full line provided with arrows, and from there are again directed via lens 5 onto object 1 as a bundle 13 of parallel beams represented by dotted lines. The angle of incidence $\theta_2$ of this beam differs from the angle of incidence $\theta_1$ of beam 12. The components reflected from the upper and lower surface of object 1 pass lens 5 as a bundle 14 of beams represented by dash-dotted lines, and reach as a convergent bundle of beams mirror 8 from which they reach, as a divergent bundle of beams, an evaluation plane 9 whose pattern can be displayed by conventional conversion with a cathode ray tube (e.g. the photocathode of a television camera or tube) or a photodetector array.

As explained in the specifications for FIGS. 1A and 1B, the beam reflected from object 1, FIG. 2, and represented by full lines consists of two components which interfere with each other and impinge again onto object 1 as a bundle 13 of beams represented by dashed lines. Due to the reflection of these components forming an interference field from the lower and upper surface of object 1, there is a splitting of this radiation into two further components which as a bundle 14 of beams represented by dash-dotted lines reach, via lens 4 and mirror 8, the evaluation plane 9 where they form an interference pattern consisting of four components. With a suitable selection of angles of incidence $\theta_1$ and $\theta_2$ adapted to the thickness of object 1, an interference fringe pattern becomes visible in evaluation plane 9, the distances between two adjacent fringes corresponding to thickness differences of of $\lambda/4$ of object 1. As pointed out above in connection with the description of FIGS. 1A and 1B, the interference pattern formed in the evaluation plane 9 and consisting of $\lambda/4$ fringes becomes, through a change of angles $\theta_1$ and $\theta_2$ caused by a tilting of mirrors 7 and 8, an interference pattern of $\lambda/2$ fringes which upon a renewed change of angles of incidence $\theta_1$ and $\theta_2$ again becomes a pattern of $\lambda/4$ fringes.

Figure 4:
FIGS. 4 and 5 are interference fringe patterns illustrating the practice of this invention.
Figure 4:
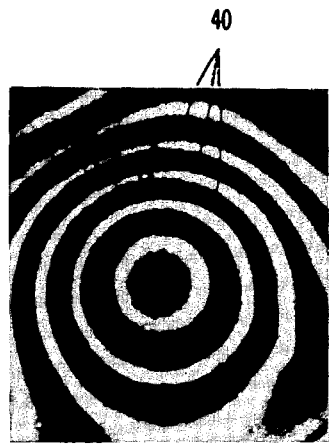
Figure 4:
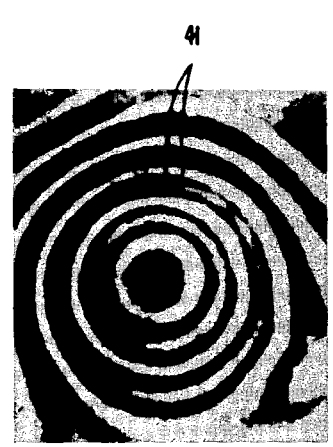
Figure 4:
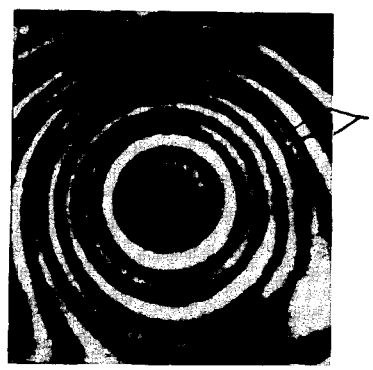
Figure 4:
Figure 4:
Figure 4:
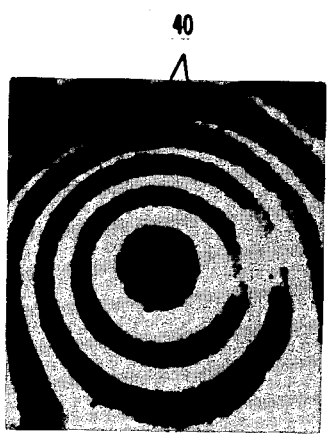
Figure 5:
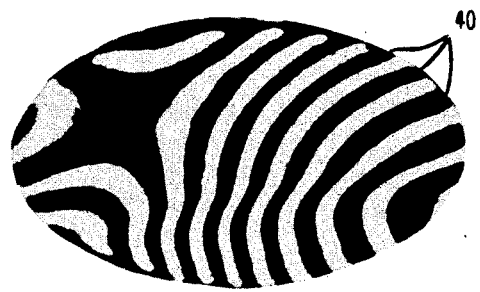
Figure 5:
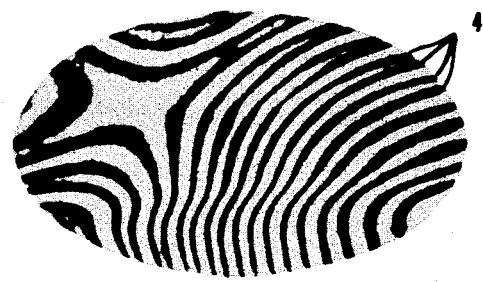
Figure 5:
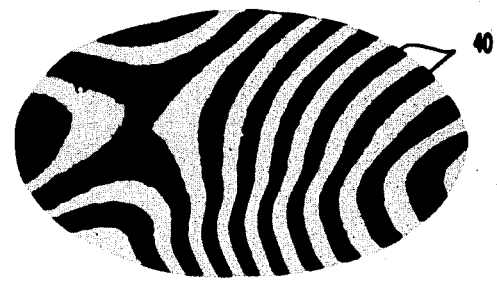

The interference patterns formed in the evaluation plane are shown in FIGS. 4 and 5. The distances between interference fringes 41 shown in these figures correspond to $\lambda/4$ distances in the object plane, whereas the interference fringes marked 40 are associated to λ/2 distances. In FIG. 5, a λ/2 interference fringe pattern is marked A, a λ/4 interference fringe pattern is marked B, and a λ/2 interference fringe pattern is marked C. FIG. 4 shows the transition, during the gradual change of angles $\theta_1$ and $\theta_2$, from an interference pattern consisting of λ/2 interference fringes into an interference pattern consisting of λ/4 interference fringes 41, and the renewed transition into a pattern consisting of λ/2 interference fringes. The pattern marked A in FIG. 4 represents an exclusive λ/2 interference fringe pattern whose fringes, as in the interference patterns marked B and C, slowly widen and split to become a pattern consisting exclusively of λ/4 interference fringes, as shown, for example, in the pattern marked D and shown in FIG. 4. The transition of the pattern marked D into an exclusively λ/2 interference fringe pattern is shown in the patterns marked E, F and G of FIG. 4.

Figure 3:
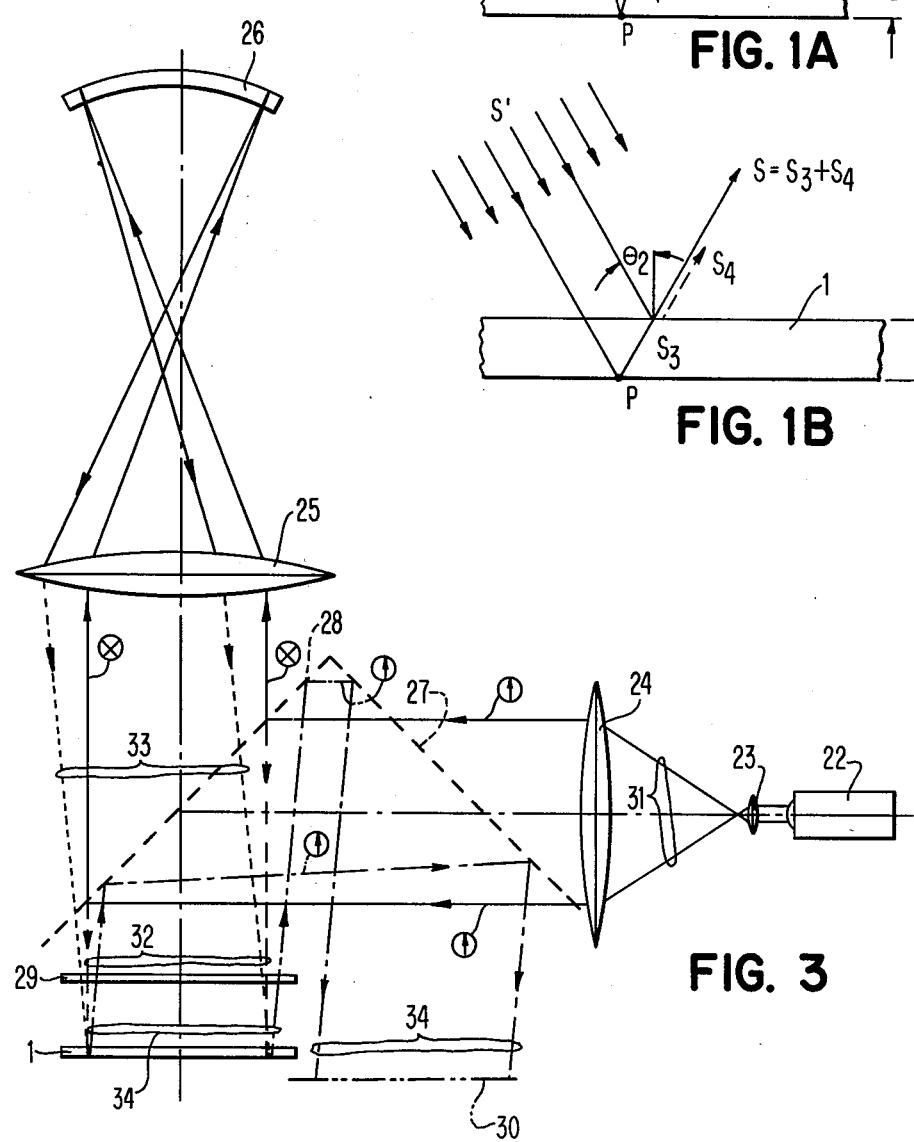
FIGS. 2 and 3 illustrate two embodiments of the invention.

The embodiment of FIG. 3 consists of a laser 22, lenses 23 and 24, a polarization-independent beam splitter 27, a polarization-dependent beam splitter 28, a lens 25, a concave mirror 26, and a quarter-wave plate 29. The beam produced by laser 22 is transformed by lens 23 into a divergent beam 31 which by lens 24 is transformed into a bundle of parallel beams. Part of this bundle of beams which is linearly polarized in parallel to the drawing plane passes beam splitter 27 and is directed by polarization-dependent beam splitter 28, as a bundle 32 of parallel beams represented by dashed lines, onto object 1 through quarter-wave plate 29. The components of beam bundle 32 which are reflected from the lower and upper surface of object 1 pass the quarter-wave plate 29 for a second time and are directed through lens 25 onto concave mirror 26 as a bundle of beams which is linearly polarized vertically to the drawing plane. The radiation reflected from concave mirror 26 is directed through lens 25 onto the object as a bundle 33 of parallel beams indicated by dashed lines 33, after having passed through quarter-wave plate 29. When passing through the quarter-wave plane 29, the radiation which is linearly polarized vertically to the drawing plane is transformed into a circularly polarized radiation. The components of beam bundle 33 reflected from the lower and upper surface of object 1 pass as a beam bundle 34 represented by dash-dotted lines the quarter-wave plate 29 and during this passage are transformed into a bundle of beams linearly polarized in parallel to the drawing plane, which at the polarization-dependent beam splitter 28 is deflected to the right without any losses. When impinging on the polarization-independent beam splitter 27, part of this bundle of beams is deflected in downward direction and produces in the range of an evaluation plane 30 an interference fringe pattern as shown in FIGS. 4 and 5. With a suitably selected angle of incidence of beam bundles 32 and 33 impinging on object 1, the interference pattern forming in evaluation plane 30 consists of λ/4 interference fringes which upon a change of the angles of incidence of beam bundles 32 and 33, continuously become λ/2, λ/4, λ/2, etc. fringes. As indicated in connection with the formulas explained following the specification of FIGS. 1A and 1B, the angles of incidence have to be suitably adapted to the thickness of the object.

For objects with poor reflection or diffuse scattering of the surfaces, it may be advisable to increase the angles of incidence in such a manner that there is a scattering which approximates a reflection.

While the invention has been illustrated and described with reference to preferred embodiments thereof, it is to be understood that the invention is not limited to the precise construction herein disclosed and the right is reserved to all changes and modifications coming within the scope of the invention as defined in the appended claims.

Having thus described our invention, what we claim as new, and desire to be secured by Letters Patent is:

1. An inteferometric method with λ/4 resolution for distance, thickness, and/or flatness measuring, characterized in that a collimated, convergent or divergent radiation ($S_o$) is directed at a first angle of incidence ($\theta_1$), or at a first range of angles of incidence onto an object (1) to be measured, that the components ($S_1$, $S_2$) of the radiation ($S_o$) reflected from different surfaces or different parts of the object to be measured are superimposed to a new radiation (S'), with this new radiation redirected onto the object to be measured at a second angle of incidence ($\theta_2$) differing from the first angle of incidence, or at a second range of angles of incidence differing from the first range, that the components ($S_3$, $S_4$) of this radiation reflected from different surfaces or parts of the object to be measured are brought into interference, and that the resulting interference fringe pattern is imaged for evaluation.

2. The interferometric method of claim 1, characterized in that the product of layer thickness (d) and difference of the cosine of the angles of incidence equals λ/4 or an odd-numbered multiple thereof.

3. The interferometric method of claim 1 characterized in that the angles of incidence ($\theta_1$, $\theta_2$) of the radiations ($S_o$, S), for altering the resolution, are controllably changeable from λ/2 to λ/4 and vice versa.

4. The interferometric method of claim 2 characterized in that the angles of incidence ($\theta_1$, $\theta_2$) of the radiations ($S_o$, S), for altering the resolution, are controllably changeable from λ/2 to λ/4 and vice versa.

5. The interferometric method of claims 1, 2 or 4 characterized in that the angles of incidence ($\theta_1$, $\theta_2$) are controllably changeable for adaptation to the reflectivities of the surfaces to be measured.

6. Apparatus for interferometric measurement comprising a light source designed as a laser (2), lenses (3, 4) for expanding the cross-section of the beam, a mirror (7) for deflecting the light beam in the direction of a lens (5) by which a bundle (12) of parallel beams impinging onto an object (1) to be measured at an angle of incidence ($\theta_1$) is generated, a concave mirror (6) directing the radiation components of the bundle (12) of parallel beams, which components are reflected from different surfaces or parts of the object (1) to be measured through the lens (5) as a bundle (13) of parallel beams at an angle ($\theta_2$) onto the object, and by a mirror (8) by which the radiation (14) reflected for the second time from the object (1) and consisting of four components is reflected into the range of an evaluation plane (9).

7. Apparatus for interferometric measurement comprising a light source designed as a laser (22), lenses (23, 24) for expanding the laser beam, a polarization-independent beam splitter (27), a polarization-dependent beam splitter (28), a quarter-wave plate (19) arranged in the path of the bundle (32) of beams deflected by the polarization-dependent beam splitter, a lens (25) transferring the components of the bundle (32) of beams reflected from the object (1) to a concave mirror (26), that lens directing again the radiation reflected from the concave mirror as a bundle (33) of parallel beams after the passage through the quarter-wave plate onto the object (1), the components of the bundle of beams (33) reflected from the object, owing to the position of its polarization plane, being deflected by the polarization-dependent beam splitter (28) in the direction of the polarization-independent beam splitter, and by the latter in the direction of an evaluation plane (30).

8. The apparatus of claims 6 or 7 characterized by visual conversion of the pattern at the evaluation plane (9, 30) by means of a photocathode of a television camera.

9. The apparatus of claims 6 or 7 characterized by visual conversion of the pattern at the evaluation plane (9, 30) by means of a photodetector array.

* * * * *

UNITED STATES PATENT AND TRADEMARK OFFICE
CERTIFICATE OF CORRECTION

PATENT NO. : 4,221,486
DATED : September 9, 1980
INVENTOR(S) : Walter Jaerisch and Guenter Makosch It is certified that error appears in the above-identified patent and that said Letters Patent are hereby corrected as shown below:

On face page of patent, inventor "GUM/u/enter" Makosch should be --Guenter Makosch--.

Signed and Sealed this

Tenth Day of March 1981

[SEAL]

Attest:

RENE D. TEGTMEYER

Attesting Officer     Acting Commissioner of Patents and Trademarks